United States Patent Office 3,642,820
Patented Feb. 15, 1972

3,642,820
4,5-DIHYDROPYRROLO[3,2,1-jk][1,4] BEZODIAZEPINES
Jackson B. Hester, Jr., Portage, Mich., assignor to The Upjohn Company, Kalamazoo, Mich.
No Drawing. Filed Nov. 3, 1969, Ser. No. 873,692
Int. Cl. C07d 27/54
U.S. Cl. 260—326.5 B      10 Claims

ABSTRACT OF THE DISCLOSURE 4,5 - dihydropyrrolo[3,2,1 - jk][1,4]benzodiazepines, processes for preparing the same and novel intermediates prepared by said processes. The novel benzodiazepines exhibit tranquilizing and anticonvulsant activity in animals.

BRIEF SUMMARY OF THE INVENTION

This invention relates to novel 4,5-dihydropyrrolo-[3,2,1-jk][1,4]benzodiazepines, processes for preparing the same and novel intermediates prepared by said processes. The novel compounds of this invention have the formula:

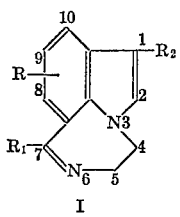

wherein R is selected from the group consisting of hydrogen, alkyl of from 1 to 3 carbon atoms, inclusive, alkoxy of from 1 to 3 carbon atoms, inclusive, bromo, chloro and fluoro; $R_1$ is selected from the group consisting of hydrogen, methoxy, ethoxy and phenyl; and $R_2$ is selected from the group consisting of hydrogen and chloro.

The intermediates of Formula II and the novel intermediates of this invention (Formula III) have the formulas:

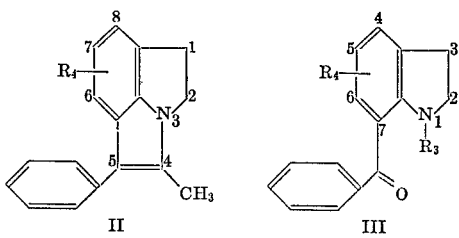

wherein $R_3$ is selected from the group consisting of hydrogen, acetyl and bromoacetyl, and $R_4$ is selected from the group consisting of hydrogen, alkyl of from 1 to 3 carbon atoms, inclusive, and alkoxy of from 1 to 3 carbon atoms, inclusive.

The terms "novel compounds" and "novel intermediates" of this invention, as used throughout the specification, embrace compounds represented by Formulas I and III above and the acid addition salts of the compounds of Formula I and the compounds of Formula III wherein $R_3$ is hydrogen. The term alkyl is inclusive of methyl, ethyl, propyl and isopropyl. The term alkoxy is inclusive of methoxy, ethoxy, propoxy and isopropoxy.

The compounds of Formula I can be prepared by processes represented by the following equations.

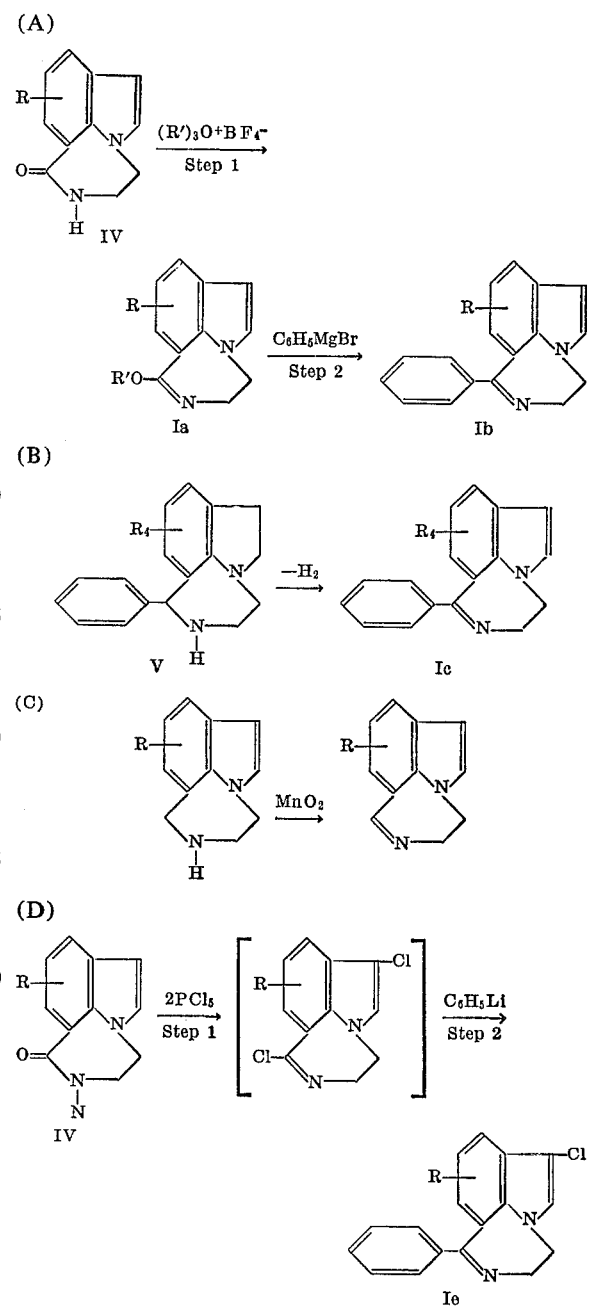

wherein R and $R_4$ are the same as above, and R' is methyl or ethyl.

DETAILED DESCRIPTION

Process A can be utilized to prepare compounds of Formula I wherein $R_1$ is restricted to methoxy, ethoxy and phenyl and wherein $R_2$ is restricted to hydrogen. Process B can be used to prepare compounds of Formula I wherein R is as given above except for bromo, chloro and fluoro, $R_1$ is restricted to phenyl, and $R_2$ is restricted to hydrogen.

Process A

Step 1 is carried out by treating a solution or suspension of the appropriate 4,5-dihydropyrrolo[3,21-jk][1,4] benzodiazepin-7(6H)-one (IV) in an inert solvent such as methylene chloride, with a solution of trimethyl- or triethyloxonium fluoroborate in the same inert solvent and allowing the mixture to stand at 25–50° C. for 5–24 hours to yield the imino ether (Ia). Triethyloxonium fluoroborate can be prepared by adding epichlorohydrin to a solution of boron trifluoride etherate in diethyl ether [Meerwein et al., J. Prakt. Chem. 147 (2), 257 (1937)]. Trimethyloxonium fluoroborate can be prepared by the reaction of triethyloxonium fluoroborate with dimethyl ether [Meerwein, Organic Syntheses, 46, 120 (1966)].

Step 2 is carried out by adding a solution of phenylmagnesium bromide in diethyl ether to a solution of the imino ether (1a) in dibutyl ether. The diethyl ether is then removed by distillation and the resulting mixture is refluxed for 2–8 hours to yield the 4,5-dihydro-7-phenylpyrrolo[3,2,1-jk][1,4]benzodiazepines of Formula Ib. The product (Ib) is recovered from the reaction mixture by conventional procedures such as crystallization, evaporation, chromatography and combinations thereof.

The 5,5 - dihydropyrrolo[3,2,1 - jk][1,4]benzodiazepin-7(6H)-ones (IV) utilized in step 1 are prepared by dehydrogenating the corresponding 1,2,4,5-tetrahydropyrrolo[3,2,1 - jk][1,4]benzodiazepin - 7(6H) - ones (VII) in accordance with the following equation.

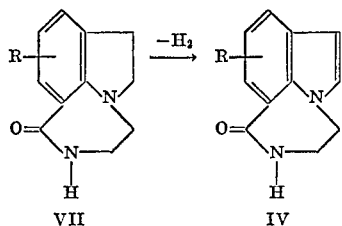

The dehydrogenation may be performed by either of two procedures.

In the first procedure, the dehydrogenation is conducted by reacting the appropriate 1,2,4,5 - tetrahydropyrrolo-[3,2,1-jk][1,4]benzodiazepin - 7(6H)-one (VII) with a palladium catalyst in the presence of an inert solvent at a temperature of from 100–200° C. for a period of 1–3 hours. Solvents that can be used in this procedure include quinoline, Decalin, p-cymene, naphthalene and mesitylene. The product is recovered by conventional procedures such as crystallization, evaporation, chromatography and combinations thereof. This procedure cannot be utilized to prepare compounds of Formula IV wherein R is halogen because the procedure removes halogen substituents from the aromatic ring.

In the second dehydrogenation procedure, the 1,2,4,5-tetrahydropyrrolo[3,2,1-jk][1,4]benzodiazepin - 7(6H)-one (VII) is refluxed with either chloroanil or 2,3 - dichloro-5,6-dicyano-1,4-benzoquinone in the presence of an inert solvent for 2–18 hours. Solvents that can be used in this procedure include benzene, toluene, xylene and the like. The product is recovered by conventional procedures such as crystallization, evaporation, chromatography and combinations thereof.

The 1,2,4,5 - tetrahydropyrrolo[3,2,1-jk][1,4]benzodiazepin-7(6H)-ones (VII) utilized in preparing compounds of Formula IV may be prepared by a process illustrated by the folowing equations.

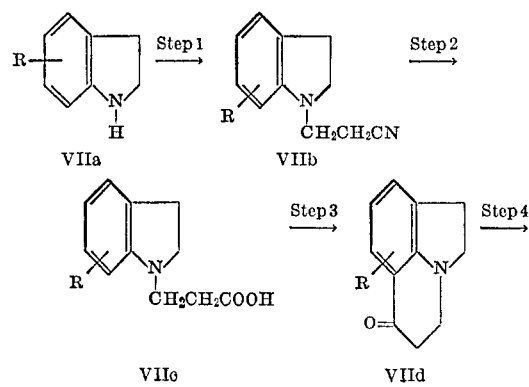

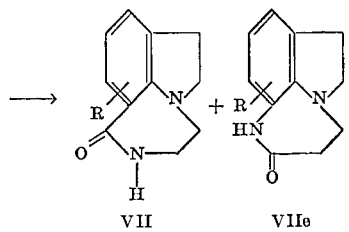

wherein R is the same as above.

Step 1 involves reacting the appropriate indoline VIIa with acrylonitrile to form a 1-indolinepropionitrile VIIb. In Step 2, the 1-indolinepropionitrile is converted to the corresponding 1-indolinepropionic acid VIIc. Step 3 involves heating 1-indolinepropionic acid with polyphosphoric acid to form a 1,2,4,5-tetrahydro-6H-pyrrolo[3,2,1-ij]quinolin-6-one VIId. The conditions utilized in these three steps are described in considerable detail in Rapoport et al., J. Org. Chem. 23, 248 (1958).

In Step 4, the 1,2,4,5-tetrahydro-6H-pyrrolo[3,2,1-ij]-quinolin-6-one VIId is reacted with sodium azide in the presence of polyphosphoric acid to form a mixture of 1,2,4,5 - tetrahydropyrrolo[3,2,1-jk][1,4]benzodiazepin-7(6H)-one VII and 1,2,4,5-tetrahydropyrrolo[1,2,3-ef]-[1,5]benzodiazepin-6(7H)one VIIe. These compounds are readily separated by conventional procedures, e.g. chromatography or fractional crystallization.

The preferred reaction temperature range is 50–60° C., however, higher or lower temperatures may be utilized if desired. The molar ratio of the ketone (VIId) to sodium azide is preferably 1:1 to 1:2 and the reaction time is from 1–5 hours.

Process B

Process B is carried out by dehydrogenating a 1,2,4,5, 6,7-hexahydro - 7 - phenylpyrrolo[3,2,1-jk][1,4]benzodiazepine (V), using the catalytic dehydrogenation procedure described above (palladium catalyst) for converting Formula VII compounds to Formula IV compounds. The product (Ic) can be recovered by conventional procedures such as crystallization, evaporation, chromatography and combinations thereof.

The 1,2,4,5,6,7-hexahydro - 7 - phenylpyrrolo[3,2,1-jk]-[1,4]benzodiazepines (V) used in this process can be prepared by the process illustrated by the following equation.

E)

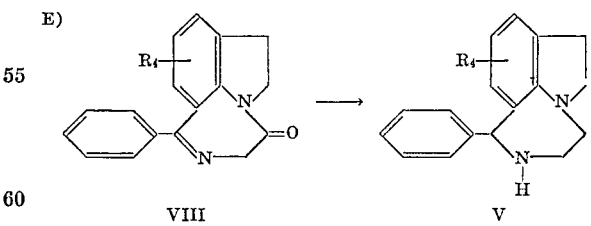

wherein $R_4$ is the same as above. In this process a 1,2-dihydro-7-phenylpyrrolo[3.2,1 - kg][1,4]benzodiazepin-4-(5H)-one (VIII) is reduced with diborane or lithium aluminum hydride at 0–100° C. in an inert solvent such as ether, tetrahydrofuran or dioxane during 1–18 hours. The product (V) can be recovered by conventional procedures such as crystallization, evaporation, chromatography and combinations thereof.

The 1,2-dihydro - 7 - phenylpyrrolo[3,2,1-jk][1,4]benzodiazepin-4(5H)-ones (VIII) utilized in Process E can be prepared by the method illustrated by the following flow scheme.

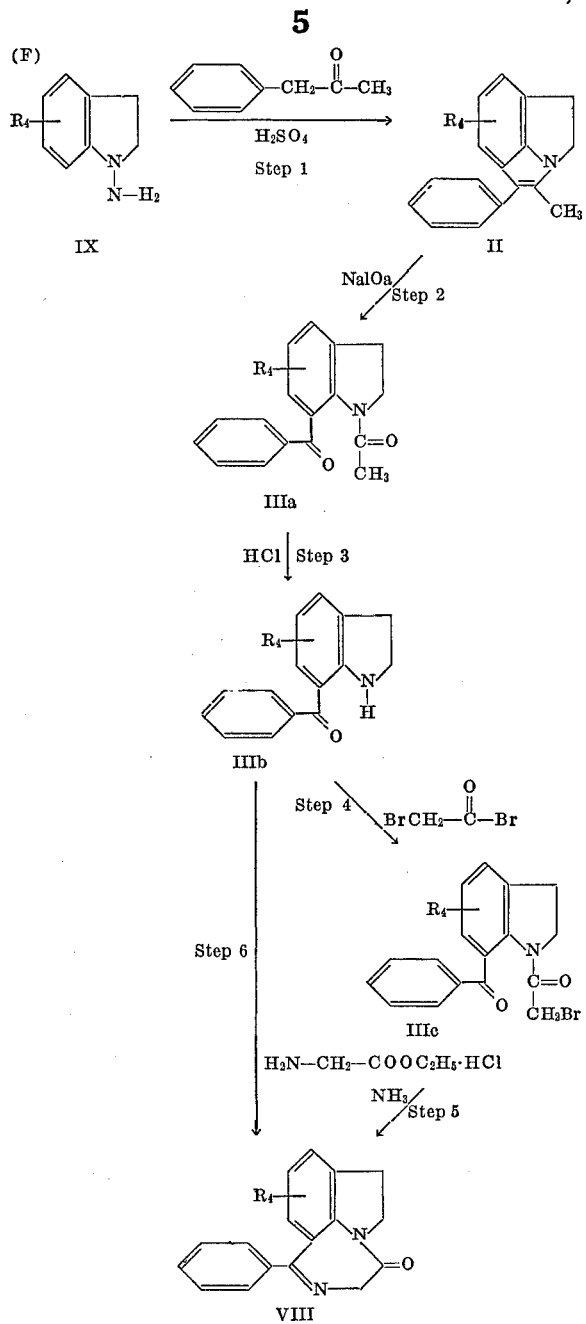

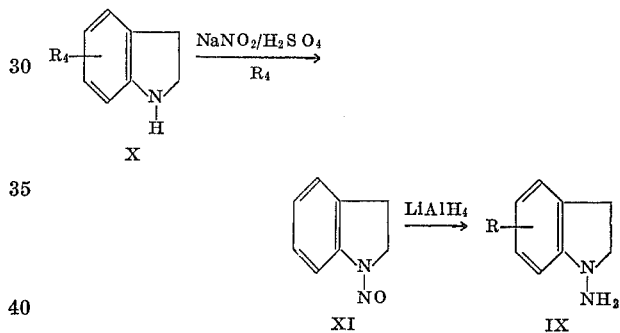

The first method is illustrated by steps 4 and 5. In step 4, the 7-benzoylindoline (IIIb) and bromoacetyl bromide in benzene is refluxed gently for 1 to 5 hours to yield a 1-(bromoacetyl)-7-benzoylindoline (IIIc). A slow stream of nitrogen is passed through the system to remove hydrogen bromide formed in the reaction. This reaction can also be carried out at 0–25° C. in ether or benzene using an acid acceptor such as pyridine or triethylamine.

In step 5, the 1-(bromoacetyl)-7-benzoylindoline (IIIc) is dissolved in a solution of anhydrous ammonia in methanol and the solution is allowed to stand at 25° C. for 5 to 18 hours to yield (VIII).

The second method is illustrated by step 6 of Process F. The 7-benzoylindoline (IIIb) is refluxed with ethyl glycinate hydrochloride and dry pyridine for 18 to 24 hours to yield (VIII).

In both methods for preparing (VIII), the product is recovered from the reaction mixture by conventional procedures, such as crystallization, evaporation, distillation, chromatography and combinations thereof.

The 1-aminoindolines (IX) utilized as starting materials in Process F can be prepared from the appropriately substituted indoline in accordance with the procedure illustrated by Process G.

wherein $R_4$ is the same as above. The details of this procedure are adequately described by Kost et al., J. Gen. Chem. 29, 3782 (1959). The indolines (X), many of which are known, can be prepared by known procedures.

wherein $R_4$ is the same as above.

In step 1 of Process F, a solution of a 1-aminoindoline (IX), phenylacetone and acetic acid in benzene is refluxed for 1–5 hours with azeotropic distillation of water. The resulting solution is concentrated; the residue is treated with dilute sulfuric acid in water or ethanol and the resulting mixture is warmed to 50–100° C. for 10–30 minutes to yield the 1,2-dihydro-4-methyl-5-phenyl-pyrrolo[3,2,1-hi]indole (II).

In step 2, the 1,2-dihydro-4-methyl-5-phenylpyrrolo-[3,2,1-hi]indole (II) is mixed with sodium metaperiodate, water and dioxane and kept at 60–70° C. for 18–24 hours to give a 1-acetyl-7-benzoylindoline (IIIa).

Step 3 is carried out by refluxing a mixture of a 1-acetyl-7-benzoylindoline (IIIa), 6 N hydrochloric acid and ethanol for 1 to 8 hours to yield a 7-benzoylindoline (IIIb).

The 1,2-dihydro-7-phenylpyrrolo[3,2,1-jk][1,4]benzodiazepin-4(5H)one (VIII) can be prepared from (IIIb) by two methods.

Process C

Process C can be utilized to prepare those compounds of Formula I wherein $R_1$ and $R_2$ are restricted to hydrogen. In this process a suspension of activated manganese dioxide is refluxed in benzene with azeotropic distillation to remove any water that may be present. The 4,5,6,7-tetrahydropyrrolo[3,2,1-jk][1,4]-benzodiazepine (VI) is then added and the mixture is refluxed for 6 to 24 hours to complete the reaction. The product (Id) is recovered from the reaction mixture by conventional procedures such as crystallization, evaporation, distillation, chromatography and combinations thereof.

The 4,5,6,7-tetrahydropyrrolo[3,2,1-jk][1,4]benzodiazepines (VI) used in Process C can be prepared by the method illustrated by the following equation.

(H)

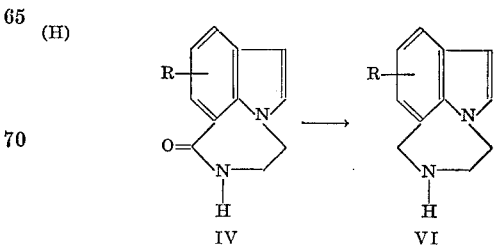

In this process, the 4,5-dihydropyrrolo[3,2,1-jk][1,4]benzodiazepin-7(6H)-one (IV) is reacted with either lithium aluminum hydride or diborane in the presence of an inert solvent to give the 4,5,6,7-tetrahydropyrrolo[3,2,1-jk][1,4]benzodiazepine (VI). The reaction can be conducted at temperatures of 0 to 100° C. and the reaction time is 1–18 hours. Inert solvents that can be used include diethyl ether, tetrahydrofuran, dioxane and diglyme.

Process D

Process D can be utilized to prepare compounds of Formula I wherein $R_1$ and $R_2$ are restricted to phenyl and chloro, respectively. In step 1 a mixture of the 4,5-dihydropyrrolo[3,2,1-jk][1,4]benzodiazepin - 7(6H)-one (IV) and two equivalents of phosphorus pentachloride in an inert solvent is refluxed for 1–3 hours. Inert solvents that can be used include benzene, toluene and xylene. In step 2, the solvent is removed and the resulting imino chloride is suspended in diethyl ether and treated at 0° C. with an excess of phenyl lithium to give a 1-chloro-4,5-dihydro - 7 - phenylpyrrolo[3,2,1-jk][1,4]benzodiazepine (Ie). The product is recovered from the reaction mixture by conventional procedures such as crystallization, evaporation, chromatography and combinations thereof.

The acid addition salts of the invention comprise the salts of the compounds of Formula I and the compounds of Formula III wherein $R_3$ is hydrogen with pharmacologically acceptable acids such as sulfuric, hydrochloric, nitric, phosphoric, lactic, benzoic, methanesulfonic, p-toluenesulfonic, salicylic, acidic, propionic, maleic, malic, tartaric, citric, cyclohexanesulfamic, succinic, nicotinic, ascorbic acids and the like.

The novel compounds of this invention exhibit tranquilizing and anticonvulsant activity in animals, including mammals. Activity was evaluated by the use of the following tests.

Chimney test [Med. Exp. 4, II (1961)].—This test determines the ability of mice to back up and out of a vertical glass cylinder within 30 seconds. Failure of mice to back up and out within this time indicates tranquilization.

Dish test.—Mice in Petri dishes (10 cm., 5 cm. high and containing shavings) climb out in a very short time, when not treated. Mice remaining in the dish for more than 3 minutes indicates tranquilization.

Pedestal test.—Mouse is placed on a pedestal. The untreated mouse leaves the pedestal in less than a minute to climb back to the floor of the standard mouse box. Tranquilized mice will stay more than 1 minute.

Nicotine antagonism test.—Thirty minutes after mice in a group are treated with the test compound, both the treated and untreated mice are injected with 2 mg./kg. of nicotine salicylate. The untreated mice show overstimulation, i.e. (1) running convulsions followed by (2) tonic extensor fits, followed by (3) death. An effective nicotine antagonist will protect the treated mice against (2) and (3).

The results of the above tests utilizing some of the novel compounds of this invention (administered intraperitoneally) are set forth in the following table. The results are expressed in terms of the mg./kg. dosage at which the tested compounds exhibited the activity in 50% of the mice ($ED_{50}$).

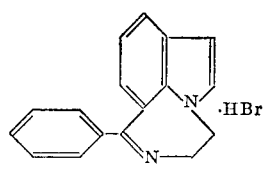

1

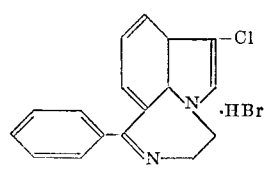

2

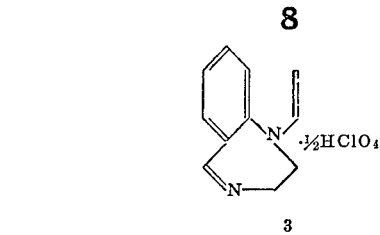

3

| Compound | 1 | 2 | 3 |
|---|---|---|---|
| Test: | | | |
| Chimney | 16 | 79 | 79 |
| Dish | 56 | >100 | 29 |
| Pedestal | 63 | >100 | 50 |
| N.A.:[1] | | | |
| TE [2] | 56 | 45 | 45 |
| D [3] | 56 | 45 | 45 |

[1] N.A.—Nicotine Antagonism.
[2] TE—Tonic Extensor Fits.
[3] D—Death.

Compounds of Formulas II and III, in addition to being intermediates for preparing the compounds of Formula I, exhibit pharmacological properties in animals, including mammals. For example, 7-chloro-1,2-dihydro-4-methyl-5-phenylpyrrolo[3,2,1]indoline (dosage 44.2 mg./kg.) and 7-benzoylindoline (dosage 42.9 mg./kg.) exhibit antiinflammatory activity when administered orally to rats. Also, the compound 1-(bromoacetyl)-7-benzoylindoline exhibits antifungal activity, e.g. against *Monilina fracticola, Rhizoctonia sloani*, Stemphylium spp. and Verticillium alba-atrum.

For purposes of administration to birds and to mammals, including animals of economic value such as horses, cattle, sheep, pigs, mice, rats, rabbits and the like, the novel compounds of the invention can be combined with solid or liquid pharmaceutical carriers and formulated in the form of tablets, powder packets, capsules and the like solid dosage forms, using starch and like excipients, or dissolved in suitable solvents or vehicles for oral or parenteral administration.

Also for mammals and birds food premixes, with starch, oatmeal, dried fishmeat, fishmeal, flour and the like can be prepared.

The novel compounds of this invention having the Formula I and the Formula III, wherein $R_3$ is hydrogen also form thiocyanic acid addition salts which, when condensed with formaldehyde, form resinous materials useful as pickling inhibitors according to U.S. Pats. 2,425,320 and 2,606,155. The fluosilicic acid addition salts are useful as mothproofing agents according to U.S. Pats. 1,915,334 and 2,075,359.

The following examples are set forth to illustrate my invention and to enable persons skilled in the art to better understand and practice the invention and are not intended to limit the same.

PREPARATIONS (A) 1,2-dihydro-4-methyl-5-phenylpyrrolo[3,2,1-hi]indole

A stirred mixture of 1-aminoindoline (47.4 g.; 0.353 mole), phenylacetone (47.4 g.; 0.353 mole), 7.05 ml. of acetic acid and 3.4 l. of benzene is refluxed under nitrogen, for about 2 hours, with azeotropic distillation of water. The solution is then concentrated under reduced pressure. A solution of the residue in 20% ethanolic sulfuric acid is warmed on the steam bath for about 10 minutes; a solid crystallizes from the reaction mixture during this period. The mixture is poured into ice water and stirred for about 45 minutes. The solid is collected by filtration and dried to give 48.3 g. of crude product, melting point 136–138° C. The filtrate is allowed to stand for 18 hours at room temperature. During this time additional product, 6.95 g., melting point 135.5–138° C. precipitates. Crystallization of the combined product from isopropanol gives 50.9 g. of product, melting point 138–

140.5° C. Recrystallization of this product from 95% ethanol yields 1,2-dihydro-4-methyl-5-phenylpyrrolo[3,2-1-hi]indole, melting point 139–140° C.

*Analysis.*—Calcd. for $C_{17}H_{15}N$ (percent): C, 87.51; H, 6.48; N, 6.00. Found (percent): C, 87.30; H, 6.52; N, 6.00.

Using the procedure described in Preparation A, but replacing 1-aminoindoline by the appropriately substituted 1-amino-indoline is productive of the corresponding 1,2-dihydro-4-methyl-5-phenylpyrrolo[3,2,1-hi]indole. Representative of the indoles so obtained are:

1,2-dihydro-4,6-dimethyl-5-phenylpyrrolo[3,2,1-hi]indole
1,2-dihydro-4,7-dimethyl-5-phenylpyrrolo[3,2,1-hi]indole
1,2-dihydro-4,8-dimethyl-5-phenylpyrrolo[3,2,1-hi]indole
1,2-dihydro-8-ethyl-4-methyl-5-phenylpyrrolo[3,2,1-hi]indole
1,2-dihydro-8-propyl-4-methyl-5-phenylpyrrolo[3,2,1-hi]indole
1,2-dihydro-8-isopropyl-4-methyl-5-phenylpyrrolo[3,2,1-hi]indole
1,2-dihydro-6-methoxy-4-methyl-5-phenylpyrrolo[3,2,1-hi]indole
1,2-dihydro-7-methoxy-4-methyl-5-phenylpyrrolo[3,2,1-hi]indole
1,2-dihydro-8-ethoxy-4-methyl-5-phenylpyrrolo[3,2,1-hi]indole
1,2-dihydro-8-propoxy-4-methyl-5-phenylpyrrolo[3,2,1-hi]indole and
1,2-dihydro-8-isopropoxy-4-methyl-5-phenylpyrrolo[3,2,1-hi]indole.

(B) 1-acetyl-7-benzoylindoline

A stirred mixture of 37.9 g. (0.163 mole) of 1,2-dihydro-4-methyl-5-phenylpyrrolo[3,2,1 - hi]indole, 87.0 g. (0.406 mole) of sodium metaperiodate, 1625 ml. of dioxane and 460 ml. of water is heated at 60° C., under nitrogen, for 20 hours. It is then poured into 5 l. of ice water and the resulting mixture is extracted with chloroform. The chloroform extract is washed with water, dried over anhydrous magnesium sulfate and concentrated in vacuo. The residue is chromatographed on 2.2 kg. of silica gel with ethyl acetate; 200-ml. fractions are collected. The substance eluted in fractions 35–51 is crystallized from ethyl acetate to give 10.9 g. (24.8%) of crude product, melting point 142–143° C. The product is recrystallized from ethyl acetate to give 1-acetyl-7-benzoylindoline, melting point 142.5° C.

*Analysis.*—Calcd. for $C_{17}H_{15}NO_2$ (percent): C, 76.96; H, 5.70; N, 5.28. Found (percent): C, 76.89; H, 5.76; N, 5.53.

Using the procedure described in Preparation B, but replacing 1,2 - dihydro - 4-methyl-5-phenylpyrrolo[3,2,1-hi]indole by the appropriately substituted 1,2-dihydro-4-methyl-5-phenylpyrrolo[3,2,1-hi]indole is productive of the correspondingly substituted 1-acetyl-7-benzoylindoline. Representative of the 1-acetyl-7-benzoylindolines so obtained are:

1-acetyl-4-methyl-7-benzoylindoline
1-acetyl-5-methyl-7-benzoylindoline
1-acetyl-6-methyl-7-benzoylindoline
1-acetyl-4-ethyl-7-benzoylindoline
1-acetyl-4-propyl-7-benzoylindoline
1-acetyl-4-isopropyl-7-benzoylindoline
1-acetyl-4-methoxy-7-benzoylindoline
1-acetyl-5-methoxy-7-benzoylindoline
1-acetyl-6-methoxy-7-benzoylindoline
1-acetyl-4-ethoxy-7-benzoylindoline
1-acetyl-4-propoxy-7-benzoylindoline and
1-acetyl-4-isoproxy-7-benzoylindoline.

(C) 7-benzoylindoline

A stirred mixture of 12.6 g. (0.0467 mole) of 1-acetyl-7-benzoylindoline, 380 ml. of 6 N hydrochloric acid and 760 ml. of absolute ethanol is refluxed under nitrogen for 5 hours and allowed to stand at room temperature for 18 hours. It is then poured into 4 l. of ice water and the resulting mixture is made ammoniacal. The crystalline product is collected by filtration, washed with water, dried and recrystallized from ethyl acetate-Skellysolve B hexanes to give 9.79 g. (84.5%) of 7-benzoylindoline, melting point 124–125° C.

*Analysis.*—Calcd. for $C_{15}H_{15}NO$ (percent): C, 80.69; H, 5.87; N, 6.27. Found (percent): C, 80.60; H, 5.93; N, 6.47.

Using the procedure described in Preparation C, but replacing 1-acetyl-7-benzoylindoline with the appropriately substituted 1-acetyl-7-benzoylindoline is productive of the correspondingly substituted 7-benzoylindoline. Representative of the 7-benzoylindolines so obtained are:

4-methyl-7-benzoylindoline
5-methyl-7-benzoylindoline
6-methyl-7-benzoylindoline
4-ethyl-7-benzoylindoline
4-propyl-7-benzoylindoline
4-isopropyl-7-benzoylindoline
5-methoxy-7-benzoylindoline
4-ethoxy-7-benzoylindoline
4-propoxy-7-benzoylindoline and
4-isopropoxy-7-benzoylindoline.

(D) 1-(bromoacetyl)-7-benzoylindoline

A stirred solution of 2.23 g. (0.01 mole) of 7-benzoylindoline (Preparation C) and pyridine (0.806 ml.; 0.01 mole) in 200 ml. of ether is treated, under nitrogen, with a solution of 2.24 g. (0.012 mole) of bromoacetyl bromide in a little ether. The resulting mixture is stirred at room temperature for 2.5 hours and poured into water. The solid product is collected by filtration, washed with water, dried in vacuo, and crystallized from ethyl acetate to give 2.43 g. of crude product. The ether layer is washed with water, dried over anhydrous potassium carbonate and concentrated. Crystallization of the residue from ethyl acetate gives 0.283 g. of additional crude product. The products are combined and recrystallized from ethyl acetate to yield 1-(bromoacetyl)-7-benzoylindoline, melting point 132.5–133° C.

*Analysis.*—Calcd. for $C_{17}H_{14}BrNO_2$ (percent): C, 59.32; H, 4.10; N, 4.07; Br, 23.22. Found (percent): C, 59.71; H, 3.95; N, 4.17; Br, 23.17.

Using the procedure described in Preparation D, but replacing 7-benzoylindoline by the appropriately substituted 7-benzoylindoline is productive of the correspondingly substituted 1-(bromoacetyl)-7-benzoylindoline. Representative of the 1-(bromoacetyl)-7-benzoylindolines so obtained are:

1-(bromoacetyl)-4-methyl-7-benzoylindoline
1-(bromoacetyl)-5-methyl-7-benzoylindoline
1-(bromoacetyl)-6-methyl-7-benzoylindoline
1-(bromoacetyl)-4-ethyl-7-benzoylindoline
1-(bromoacetyl)-4-propyl-7-benzoylindoline
1-(bromoacetyl)-4-isopropyl-7-benzoylindoline
1-(bromoacetyl)-5-methoxy-7-benzoylindoline
1-(bromoacetyl)-4-ethoxy-7-benzoylindoline
1-(bromoacetyl)-4-propoxy-7-benzoylindoline and
1-(bromoacetyl)-4-isopropoxy-7-benzoylindoline.

(E) 1,2-dihydro-7-phenylpyrrolo[3,2,1-jk][1,4]benzodiazepin-4(5H)-one

A solution of 1.0 g. (0.00299 mole) of 1-(bromoacetyl)-7-benzoylindoline (Preparation D) in 100 ml. of tetrahydrofuran is mixed with 36 ml. of a 13% solution of ammonia in methanol, and the resulting solution is stirred at room temperature, under nitrogen, for 19 hours. It is then concentrated under reduced pressure at 25° C. The residue is mixed with water and extracted with methylene chloride. The extract is dried over anhydrous potassium carbonate and concentrated. Crystallization of the resulting product from ethyl acetate-Skellysolve B hexanes gives 0.63 g. of crude product. This product is recrystallized from ethyl acetate-Skellysolve B hexanes to give 1,2-dihydro - 7 - phenylpyrrolo[3,2,1-jk][1,4]benzodiazepin-4(5H)-one, melting point 140–141.5° C.

*Analysis.*—Calcd. for $C_{17}T_{14}N_2O$ (percent): C, 77.84; H, 5.38; N, 10.68. Found (percent): C, 77.90; H, 5.29; N, 10.83

Using the procedure described in Preparation E, but replacing 1-(bromoacetyl)-7-benzoylindoline by the appropriately substituted 1-(bromoacetyl)-7-benzoylindoline is productive of the corresponding 1,2-dihydro-7-phenylpyrrolo[3,2,1-jk][1,4]benzodiazepin-4(5H) - one. Representative of the 1,2-dihydro-7-phenylpyrrolo[3,2,1-jk][1,4]benzodiazepin-4(5H)-ones so obtained are:

1,2-dihydro-8-methyl-
1,2-dihydro-9-methyl-
1,2-dihydro-10-methyl-
1,2-dihydro-9-ethyl-
1,2-dihydro-9-propyl-
1,2-dihydro-9-isopropyl-
1,2-dihydro-8-methoxy-
1,2-dihydro-9-methoxy-
1,2-dihydro-10-methoxy-
1,2-dihydro-9-ethoxy-
1,2-dihydro-9-propoxy- and
1,2-dihydro-9-isopropoxy-7-phenylpyrrolo[3,2,1-jk][1,4]benzodiazepin-4(5H)-ones.

(F) 1,2,4,5,6,7-hexahydro-7-phenylpyrrolo[3,2,1-jk][1,4]benzodiazepine 1,2 - dihydro - 7 - phenylpyrrolo[3,2,1-jk][1,4]benzodiazepin-4(5H)-one (11.0 g.; 0.0418 mole) (Preparation E) is added under nitrogen to an ice-cold, stirred suspension of 11 g. (0.29 mole) of lithium aluminum hydride in 1.1 l. of tetrahydrofuran and the resulting mixture is refluxed for 18 hours, cooled in an ice bath and treated successively with 11 ml. of water, 11 ml. of 15% aqueous sodium hydroxide and 33 ml. of water. This mixture is stirred for a few minutes and filtered. The filtrate is concentrated in vacuo and the residue is crystallized from ethyl acetate-Skellysolve B hexanes to give 8.88 g. of crude product. The product is recrystallized from ethyl acetate-Skellysolve B hexanes to give 1,2,4,5,6,7-hexahydro - 7-phenylpyrrolo[3,2,1-jk][1,4]benzodiazepine, melting point 102–103.5° C.

*Analysis.*—Calcd. for $C_{17}H_{18}N_2$ (percent): C, 81.56; H, 7.25; N, 11.19. Found (percent): C, 81.57; H, 7.20; N, 11.12.

Using the procedure described in Preparation F, but replacing 1,2-dihydro-7-phenylpyrrolo[3,2,1-jk][1,4]benzodiazepin-4(5H)-one by the appropriately substituted 1,2-dihydro-7-phenylpyrrolo[3,2,1-jk][1,4]benzodiazepin - 4(5H)-one is productive of the corresponding 1,2,4,5,6,7-hexahydro - 7 - phenylpyrrolo[3,2,1-jk][1,4]benzodiazepine. Representative of the benzodiazepines so obtained are:

1,2,4,5,6,7-hexahydro-8-methyl-
1,2,4,5,6,7-hexahydro-9-methyl-
1,2,4,5,6,7-hexahydro-10-methyl-
9-ethyl-1,2,4,5,6,7-hexahydro-
1,2,4,5,6,7-hexahydro-9-isopropyl-
1,2,4,5,6,7-hexahydro-8-methoxy-
1,2,4,5,6,7-hexahydro-9-methoxy-
1,2,4,5,6,7-hexahydro-10-methoxy-
9-ethoxy-1,2,4,5,6,7-hexahydro-
1,2,4,5,6,7-hexahydro-9-propoxy- and
1,2,4,5,6,7-hexahydro-10-propoxy-7-phenylpyrrolo[3,2,1-jk][1,4]benzodiazepines.

(G) 1,2,4,5 - tetrahydropyrrolo[3,2,1-jk][1,4]benzodiazepin-7(6H)-one and 1,2,4,5-tetrahydropyrrolo[1,2,3-ef]-[1,5]benzodiazepin-6(7H)-one (a) Mixture of 1,2,4,5 - tetrahydropyrrolo[3,2,1-jk]-[1,4]-benzodiazepin-7(6H)-one and 1,2,4,5 - tetrahydropyrrolo[1,2,3-ef][1,5]-benzodiazepin - 6(7H) - one.—A stirred mixture of 15.0 g. (0.0867 mole) of 1,2,4,5-tetrahydro-6H-pyrrolo[3,2,1-ij]quinolin-6-one and 450 g. of polyphosphoric acid is warmed under nitrogen to 50° C. and treated over a period of one hour with 7.35 g. (0.113 mole) of sodium azide. The reaction mixture is stirred an additional 3.5 hours at 50° C. and then poured into 4 l. of ice water. The resulting mixture is stirred until solution is obtained. The solution is made alkaline with 50% aqueous sodium hydroxide and extracted with chloroform. The chloroform extract is washed with water, dried over anhydrous potassium carbonate and concentrated under reduced pressure to yield a mixture of 1,2,4,5-tetrahydropyrrolo[3,2,1-jk][1,4]benzodiazepin - 7(6H) - one and 1,2,4,5 - tetrahydropyrrolo[1,2,3-ef][1,5]benzodiazepin-6(7H)-one.

(b) 1,2,4,5 - tetrahydropyrrolo[1,2,4-ef][1,5]benzodiazepin-6(7H)-one.—The mixture prepared in part (a) is chromatographed on 800 g. of silica gel (elution with 15% methanol-85% ethyl acetate) and the eluate is collected in 100-ml. fractions. Fractions 15–23 are combined and then recrystallized successively from ethyl acetate-Skellysolve B hexanes and methylene chloride-ethyl acetate to yield 1,2,4,5-tetrahydropyrrolo[1,2,3-ef][1,5]benzodiazepin-6(7H)-one, melting point 163–164° C.

*Analysis.*—Calcd. for $C_{11}H_{12}N_2O$ (percent): C, 70.18; H, 6.43; N, 14.88. Found (percent): C, 69.95; H, 6.67; N, 14.80.

(c) 1,2,4,5 - tetrahydropyrrolo[3,2,1-jk][1,4]benzodiazepin-7(6H)-one.—Fraction 27–50 eluted during the chromatography in part (b) above are combined and recrystallized twice from ethyl acetate to yield 1,2,4,5-tetrahydropyrrolo[3,2,1-jk][1,4]-benzodiazepin - 7(6H) - one, melting point 151–152.5° C.

*Analysis.*—Calcd. for $C_{11}H_{12}N_2O$ (percent): C, 70.18; H, 6.43; N, 14.88. Found (percent): C, 70.31; H, 6.39; N, 15.08.

Using the procedure described in Preparation G, but replacing 1,2,4,5-tetrahydro-6H-pyrrolo[3,2,1-ij]-quinolin-6-one by the appropriately substituted 1,2,4,5-tetrahydro-6H-pyrrolo[3,2,1-ij]quinolin-6-one is productive of the corresponding 1,2,4,5 - tetrahydropyrrolo[3,2,1-jk][1,4]benzodiazepin-7(6H)-one. Representative of the 1,2,4,5-tetrahydropyrrolo[3,2,1-jk][1,4]benzodiazepin - 7(6H)-ones so obtained are:

9-methyl-1,2,4,5-tetrahydropyrrolo-
9-methoxy-1,2,4,5-tetrahydropyrrolo-
8-ethyl-1,2,4,5-tetrahydropyrrolo-
9-ethyl-1,2,4,5-tetrahydropyrrolo- and
10-ethyl-1,2,4,5-tetrahydropyrrolo[3,2,1-jk][1,4]benzodiazepin-7(6H)-ones.

(H) 4,5-dihydropyrrolo[3,2,1-jk][1,4]benzodiazepin-7(6H)-one

A stirred mixture of 23.8 g. (0.127 mole) of 1,2,4,5-tetrahydropyrrolo[3,2,1-jk][1,4]benzodiazepin - 7(6H)-one (Preparation G), 380 ml. of Decalin and 11.5 g. of 10% palladium-on-carbon catalyst is refluxed under nitrogen for 1.5 hours. The mixture is cooled in an ice bath, diluted with 450 ml. of Skellysolve B hexanes and allowed to crystallize. The solid is collected by filtration, washed with Skellysolve B hexanes and extracted with methanol. The methanol extract is concentrated under reduced pressure, and the residue is crystallized from methanol-ethyl acetate to give 16.19 g. of crude product. This crude product is recrystallized from methanol-ethyl acetate to yield 4,5-dihydropyrrolo[3,2,1-jk][1,4]benzodiazepin - 7(6H)-one, melting point 173–174° C.

*Analysis.*—Calcd. for $C_{11}H_{10}N_2O$ (percent): C, 70.95; H, 5.41; N, 15.05. Found (percent): C, 71. 34; H, 5.41; N, 15.01.

Using the procedure of Preparation H, but replacing 1,2,4,5 - tetrahydropyrrolo[3,2,1-jk][1,4]benzodiazepin-7(6H)-one by the appropriately substituted 1,2,4,5-tetrahydropyrrolo[3,2,1-jk][1,4]benzodiazepin - 7(6H) - one is productive of the corresponding 4,5-dihydropyrrolo[3,2, 1-jk][1,4]benzodiazepin-7(6H)-one. Representative of the 4,5-dihydropyrrolo[3,2,1-jk]benzodiazepin - 7(6H) - ones so obtained are:

4,5-dihydro-9-methylpyrrolo-
4,5-dihydro-9-methoxypyrrolo-
4,5-dihydro-8-ethylpyrrolo-
4,5-dihydro-9-ethylpyrrolo- and
4,5-dihydro-10-ethylpyrrolo[3,2,1-jk][1,4]-
  benzodiazepin-7(6H)-ones.

(1) 9 - chloro - 1,2,4,5-tetrahydropyrrolo[3,2,1-jk][1,4]-benzodiazepin - 7(6H) - one and 9-chloro-1,2,4,5-tetrahydropyrrolo[1,2,3 - ef][1,5]benzodiazepin - 6(7H)-one (a) Mixture of 9 - chloro - 1,2,4,5-tetrahydropyrrolo-[3,2,1-jk][1,4]benzodiazepin-7(6H) - one and 9-chloro-1,2,4,5 - tetrahydropyrrolo[1,2,3 - ef][1,5]benzodiazepin-6(7H) - one.—A stirred mixture of 4.15 g. (0.02 mole) of 8 - chloro - 1,2,4,5 - tetrahydro - 6H - pyrrolo[3,2,1-ij]quinolin-6-one and 120 g. of polyphosphoric acid is heated under nitrogen to 50–60° C. and treated portionwise with 1.69 g. (0.026 mole) of sodium azide over a period of 1 hour. The mixture is kept at a temperature of 50–60° C. for an additional 4 hours and then poured into ice water. The resulting solution is rendered alkaline with 50% aqueous sodium hydroxide and extracted several times with chloroform. The combined extract is washed with a saturated aqueous solution of sodium chloride, dried over anhydrous magnesium sulfate and concentrated under reduced pressure to yield a mixture of 9 - chloro - 1,2,4,5-tetrahydropyrrolo[3,2,1-jk][1,4]-benzodiazepin - 7(6H)-one and 9 - chloro - 1,2,4,5 - tetrahydropyrrolo[1,2,3-ef][1,5]benzodiazepin-6(7H)-one.

Using the procedure described in part (a) above replacing 8 - chloro - 1,2,4,5 - tetrahydro - 6H - pyrrolo-[3,2,1-ij]-quinolin-6-one by the appropriately substituted 1,2,4,5-tetrahydro - 6H - pyrrolo[3,2,1-ij]-quinolin-6-one is productive of a mixture of the corresponding 1,2,4,5-tetrahydropyrrolo[3,2,1 - jk][1,4]benzodiazepin - 7(6H)-one and 1,2,4,5 - tetrahydropyrrolo[1,2,3-ef][1,5]benzodiazepin-6(7H)-one.

(b) 9 - chloro - 1,2,4,5 - tetrahydropyrrolo[3,2,1-jk][1,4]-benzodiazepin-7(6H)-one.—The above mixture of 9-chloro-1,2,4,5-tetrahydropyrrolo[3,2,1 - jk][1,4]benzodiazepin - 7(6H) - one and 9 - chloro - 1,2,4,5-tetrahydropyrrolo[1,2,3-ef][1,5]benzodiazepin - 6(7H) - one is dissolved in methanol-ethyl acetate (decolorizing charcoal treatment). The solution is filtered and cooled and the solid that precipitates is separated by filtration. The solid is then recrystallized from methylene chloride-ethyl acetate to yield 9 - chloro - 1,2,4,5 - tetrahydropyrrolo-[3,2,1-jk][1,4]benzodiazepin - 7(6H) - one, melting point 201.5–202° C.

Analysis.—Calcd. for $C_{11}H_{11}ClN_2O$ (percent): C, 59.33; H, 4.98; Cl, 15.92; N, 12.58. Found (percent): C, 58.97; H, 5.07; Cl, 16.08; N, 12.09.

(c) 9 - chloro - 1,2,4,5 - tetrahydropyrrolo[1,2,3-ef][1,5]benzodiaezpin-6(7H) - one.—The filtrate from the methanol-ethyl acetate recrystallization described in the above part (b) is concentrated and chromatographed on 150 g. of silica gel with 5% methanol-95% ethyl acetate; 50-ml. fractions are collected. Fractions 6–10 are collected and crystallized from ethyl acetate to give 0.249 g. of crude product. This crude product is recrystallized from a mixture of ethyl acetate and Skellysolve B hexanes to yield 9 - chloro - 1,2,4,5 - tetrahydropyrrolo[1,2,3-ef][1,5]benzodiazepin - 6(7H) - one, melting point 169.5–170° C.

Analysis.—Calcd. for $C_{11}H_{11}ClN_2O$ (percent): C, 59.33; H, 4.98; Cl, 15.92; N, 12.58. Found (percent): C, 59.65; H, 4.98; Cl, 16.06; N, 12.38.

Further elution of the column with 10% methanol-90% ethyl acetate yields 9-chloro - 1,2,4,5 - tetrahydropyrrolo-[3,2,1-jk][1,4]benzodiazepin-7(6H) - one, identical with the product of part (b) above.

Using the procedure described in Preparation I, but replacing 8 - chloro - 1,2,4,5 - tetrahydro - 6H - pyrrolo-[3,2,1-ij]quinolin-6-one with the appropriately substituted halo - 1,2,4,5 - tetrahydro - 6H-pyrrolo[3,2,1-ij]quinolin-6-one is productive of the corresponding halo-1,2,4,5-tetrahydropyrrolo[3,2,1-jk][1,4]benzodiazepin - 7(6H) - one. Representative of the halo - 1,2,4,5 - tetrahydropyrrolo-[3,2,1-jk][1,4]benzodiazepin-7(6H)-ones so obtained are:

8-chloro-1,2,4,5-tetrahydropyrrolo-
10-chloro-1,2,4,5-tetrahydropyrrolo-
8-bromo-1,2,4,5-tetrahydropyrrolo-
9-bromo-1,2,4,5-tetrahydropyrrolo-
10-bromo-1,2,4,5-tetrahydropyrrolo-
8-fluoro-1,2,4,5-tetrahydropyrrolo-
9-fluoro-1,2,4,5-tetrahydropyrrolo- and
10-fluoro-1,2,4,5-tetrahydropyrrolo[3,2,1-jk][1,4]-
  benzodiazepin-7(6H)-ones.

(J) 9-chloro-4,5-dihydropyrrolo[3,2,1-jk][1,4]
benzodiazepin-7(6H)-one

A stirred mixture of 9-chloro-1,2,4,5-tetrahydropyrrolo-[3,2,1-jk][1,4]benzodiazepin-7(6H)-one (Preparation I) (10.0 g.; 0.0450 mole), 2,3 - dichloro - 5,6-dicyano-1,4-benzoquinone (12.3 g.; 0.0542 mole) and dry benzene (200 ml.) is refluxed under nitrogen for 7 hr., cooled and filtered. The solid is suspended in a mixture of cold, dilute sodium hydroxide and methylene chloride, stirred for 30 min. and filtered. The methylene chloride solution is washed with brine, dried over anhydrous potassium carbonate and concentrated. Crystallization of the residue from tetrahydrofuran (decolorizing charcoal treatment) gives 2.20 g. of the desired product, melting point 230–232.5° C. A sticky solid obtained from filtration of the above dilute sodium hydroxide-methylene chloride mixture is mixed with infusorial earth, washed several times with cold, dilute sodium hydroxide and then with water, and extracted with a hot methanol-methylene chloride mixture. Concentration of the extract provides a residue which is crystallized from tetrahydrofuran to give an additional 3.81 g. (60.8% total yield) of the desired product, melting point 230–233° C. Recrystallization from methanol-methylene chloride gives 9-chloro-4,5-dihydropyrrolo-[3,2,1-jk][1,4]benzodiazepin-7(6H) - one, melting point 231.5–232.5° C.

Analysis.—Calcd. for $C_{11}H_9ClN_2O$ (percent): C, 59.87; H, 4.11; Cl, 16.07; N, 12.70. Found (percent): C, 59.68; H, 3.93; Cl, 16.19; N, 12.27.

Using the procedure described in Preparation J, but replacing 9 - chloro - 1,2,3,4 - tetrahydropyrrolo[3,2,1-jk][1,4]benzodiazepin-7(6H)-one by the appropriately substituted halo - 1,2,3,4 - tetrahydropyrrolo[3,2,1-jk][1,4]benzodiazepin-7(6H)-ones is productive of the corresponding halo - 4,5 - dihydropyrrolo[3,2,1-jk][1,4]benzodiazepin-7(6H)-one. Representative of the halo-4,5-dihydropyrrolo[3,2,1-jk][1,4]benzodiazepin - 7(6H) - ones so obtained are:

8-chloro-4,5-dihydropyrrolo-
10-chloro-4,5-dihydropyrrolo-
8-bromo-4,5-dihydropyrrolo-
9-bromo-4,5-dihydropyrrolo-
10-bromo-4,5-dihydropyrrolo-
8-fluoro-4,5-dihydropyrrolo-
9-fluoro-4,5-dihydropyrrolo- and
10-fluoro-4,5-dihydropyrrolo[3,2,1-jk][1,4[benzo-
  diazepin-7(6H)-ones.

(K) 4,5,6,7-tetrahydropyrrolo[3,2,1-jk][1,4]
benzodiazepine

A solution of 4,5-dihydropyrrolo[3,2,1-jk][1,4]benzodiazepine-7(6H)-one (11.2 g.; 0.0604 mole) in dry tetrahydrofuran (900 ml.) is added under nitrogen to a stirred, refluxing suspension of lithium aluminum hydride (11.5 g.) in tetrahydrofuran (500 ml.). The resulting mixture is refluxed for 18 hours, cooled in an ice bath and treated successively with water (11.5 ml.), 15% sodium hydroxide (11.5 ml.) and water (34.5 ml.). The solid is collected by filtration and the filtrate is concentrated under reduced pressure. Crystallization of the residue from ethyl acetate-Skellysolve B hexanes gives 5.32 g. (51%) of 4,5,6,7-tetrahydropyrrolo[3,2,1-jk][1,4]benzodiazepin, melting point 60–62° C. The analytical sample, melting point 62.5–63.5° C., is prepared by recrystallizing some of this material from ethyl acetate-Skellysolve B hexanes.

*Analysis.*—Calcd. for $C_{11}H_{12}N_2$ (percent): C, 76.71; H, 7.02; N, 16.27. Found (percent): C, 76.83; H, 7.05; N, 16.12.

Using the procedure described in Preparation K, but replacing 4,5-dihydropyrrolo[3,2,1-jk][1,4]benzodiazepin-7(6H)-one by the appropriately substituted 4,5-dihydropyrrolo[3,2,1-jk][1,4]benzodiazepin - 7(6H) - one is productive of the corresponding 4,5,6,7-tetrahydropyrrolo-[3,2,1-jk][1,4]benzodiazepine. Representative of the 4,5,6,7-tetrahydropyrrolo[3,2,1-jk][1,4]benzodiazepines so obtained are:

9-methyl-4,5,6,7-tetrahydropyrrolo-
9-methoxy-4,5,6,7-tetrahydropyrrolo-
8-ethyl-4,5,6,7-tetrahydropyrrolo-
8-methyl-4,5,6,7-tetrahydropyrrolo-
10-ethyl-4,5,6,7-tetrahydropyrrolo-
9-chloro-4,5,6,7-tetrahydropyrrolo-
9-bromo-4,5,6,7-tetrahydropyrrolo- and
8-fluoro-4,5,6,7-tetrahydropyrrolo[3,2,1-jk][1,4]benzodiazepines.

EXAMPLE 1

*7-ethoxy-4,5-dihydropyrrolo[3,2,1-jk][1,4]benzodiazepine and fluoroborate thereof*

A stirred solution of 3.72 g. (0.020 mole) of 4,5-dihydropyrrolo[3,2,1-jk][1,4]benzodiazepin - 7(6H) - one (Preparation H) in 100 ml. of dry methylene chloride is cooled in an ice bath, under nitrogen, and treated with 25 ml. of a methylene chloride solution of triethyloxonium fluoroborate containing 0.05 mole of the latter. The resulting solution is kept at ambient temperatures for 19 hours, refluxed for 4 hours, cooled in an ice bath and treated with 7.92 g. of 50% aqueous potassium carbonate solution. The mixture is stirred for a few minutes and filtered through potassium carbonate. The filtrate is concentrated in vacuo, and the residue is crystallized from methylene chloride-ethyl acetate to give 4.67 g. of crude product. A second crop of crude product is obtained by crystallizing the mother liquors, using a small amount of silica gel to remove the contaminants. The two crops of product (total yield 82.7%) are combined and recrystallized from methylene chloride-ethyl acetate to yield 7-ethoxy-4,5-dihydropyrrolo[3,2,1-jk][1,4]benzodiazepine fluoroborate, melting point 142–143.5° C.

*Analysis.*—Calcd. for $C_{13}H_{14}N_2O \cdot HBF_4$ (percent): C, 51.68; H, 5.01; N, 9.28; F, 25.16. Found (percent): C, 51.50; H, 4.82; N, 9.49; F, 24.77.

A stirred suspension of 3.02 g. (0.01 mole) of 7-ethoxy-4,5 - dihydropyrrolo[3,2,1-jk][1,4]benzodiazepine fluoroborate (Example 1) in about 50 ml. of diethyl ether is cooled in an ice bath and treated with dilute aqueous potassium carbonate solution. The mixture is stirred until the yellow solid dissolves. The aqueous layer is extracted with diethyl ether and the combined ether solution is washed with a saturated solution of sodium chloride, dried over anhydrous potassium carbonate and concentrated in vacuo. A solution of the residue in benzene is concentrated in vacuo to remove the last traces of water and give 7-ethoxy - 4,5 - dihydropyrrolo[3,2,1-jk][1,4]benzodiazepine as an oil.

Using the procedure described in Example 1, but replacing 4,5-dihydropyrrolo[3,2,1-jk][1,4]benzodiazepin-7(6H)-one by the appropriately substituted 4,5-dihydropyrrolo[3,2,1-jk][1,4]benzodiazepin - 7(6H)-one and/or replacing triethyloxonium fluoroborate by trimethyloxonium fluoroborate is productive of other 7-alkoxy-4,5-dihydropyrrolo[3,2,1-jk][1,4]benzodiazepines and the fluoroborates thereof. Representative of the compounds so obtained are:

9-methyl-7-ethoxy-4,5-dihydropyrrolo-
9-methoxy-7-ethoxy-4,5-dihydropyrrolo-
9-chloro-7-ethoxy-4,5-dihydropyrrolo-
8-ethyl-7-ethoxy-4,5-dihydropyrrolo-
10-ethyl-7-ethoxy-4,5-dihydropyrrolo-
9-methyl-7-methoxy-4,5-dihydropyrrolo-
7,9-dimethoxy-4,5-dihydropyrrolo-
9-bromo-7-methoxy-4,5-dihydropyrrolo- and
7,8-dimethoxy-4,5-dihydropyrrolo[3,2,1-jk][1,4]benzodiazepines and fluoroborates thereof.

EXAMPLE 2

*4,5-dihydro-7-phenylpyrrolo[3,2,1-jk][1,4]benzodiazepine and hydrobromide thereof*

Diethyl ether is distilled, under nitrogen, from a solution of 5 ml. of 3 M ethereal phenylmagnesium bromide in 20 ml. of dibutyl ether. To the resulting refluxing solution is added, during 15 minutes, 15 ml. of a solution of 7-ethoxy - 4,5-dihydropyrrolo[3,2,1-jk][1,4]benzodiazepine (Example 1) in dibutyl ether. The resulting yellow suspension is refluxed for 8 hours, cooled and poured into ice water. This mixture is acidified with hydrochloric acid and filtered through diatomaceous earth. The filter cake is washed with dilute hydrochloric acid and the combined filtrate and washing is washed with diethyl ether. The aqueous layer is cooled in an ice bath, made alkaline with sodium hydroxide and extracted with diethyl ether. The ether extract is washed with a saturated solution of sodium chloride, dried over anhydrous potassium carbonate and concentrated in vacuo to give 4,5-dihydro-7-phenylpyrrolo[3,2,1-jk][1,4]benzodiazepine as a residue. This base is also prepared in Example 3, using a different procedure.

A solution of the residue in ethyl acetate is acidified with methanolic hydrogen bromide and the resulting salt is recrystallized from methanol-ethyl acetate (decolorizing charcoal treatment) to give 1.41 g. (43.1%) of 4,5-dihydro - 7 - phenylpyrrolo[3,2,1-jk][1,4]benzodiazepine hydrobromide, melting point 272.5–274.5° C. This salt is also prepared in Example 3.

Using the procedure described in Example 2, but replacing 7 - ethoxy - 4,5 - dihydropyrrolo[3,2,1-jk][1,4] benzodiazepine by the appropriately substituted 7-alkoxy-4,5 - dihydropyrrolo[3,2,1 - jk][1,4]benzodiazepine is productive of the corresponding 4,5-dihydro-7-phenylpyrrolo[3,2,1-jk][1,4]benzodiazepines and hydrobromides thereof. Representative of the compounds so obtained are:

4,5-dihydro-9-methyl-7-phenylpyrrolo-
4,5-dihydro-9-methoxy-7-phenylpyrrolo-
9-chloro-4,5-dihydro-7-phenylpyrrolo-
4,5-dihydro-8-ethyl-7-phenylpyrrolo-
4,5-dihydro-9-ethyl-7-phenylpyrrolo-
4,5-dihydro-10-ethyl-7-phenylpyrrolo-
9-bromo-4,5-dihydro-7-phenylpyrrolo- and
4,5-dihydro-8-fluoro-7-phenylpyrrolo[3,2,1-jk][1,4]benzodiazepines and hydrobromides thereof.

EXAMPLE 3

*4,5-dihydro - 7 - phenylpyrrolo[3,2,1-jk][1,4]benzodiazepine and hydrobromide thereof; and 4,5,6,7-tetrahydro-7 - phenylpyrrolo[3,2,1-jk][1,4]benzodiazepine and hydrochloride thereof*

A stirred mixture of 5.0 g. (0.02 mole) of 1,2,4,5,6,7-hexahydro - 7 - phenylpyrrolo[3,2,1-jk][1,4]benzodiazepine (Preparation F), 2.5 g. of 10% palladium-on-carbon catalyst and 100 ml. of Decalin is refluxed under nitrogen for 1.5 hours, cooled and filtered through diatomaceous earth. The solid is washed with ether and the combined filtrate and washing is acidified with cold dilute hydrochloric acid. The organic layer is separated from the aqueous layer and an insoluble gum, and is washed with dilute hydrochloric acid. The combined acidic aqueous solution and gum is washed with ether, treated with methylene chloride and made alkaline with sodium hydroxide. The aqueous layer is extracted with methylene chloride and the combined methylene chloride solution is washed with water, dried over anhydrous potassium carbonate and concentrated. The residue is chromatographed on 250 g. of silica gel with 2% triethylamine-48% ethyl acetate-50% cyclohexane to yield basic material which is converted to 1.48 g. of crystalline hydrobromide. This hydrobromide, a mixture of two compounds, is converted to free base and is then rechromatographed on 100 g. of silica gel with 40% ethyl acetate-50% cyclohexane, 50-ml. fractions being collected.

(a) 4,5,6,7 - tetrahydro-7-phenylpyrrolo[3,2,1-jk][1,4] benzodiazepine and hydrochloride thereof.—The first compound, 4,5,6,7-tetrahydro-7-phenylpyrrolo[3,2,1-jk][1,4] benzodiazepine is eluted in fractions 16–23.

This eluate is acidified with methanolic hydrogen chloride to yield 0.223 g. of crude product. The crude product is recrystallized twice from methanol-ethyl acetate to yield 4,5,6,7-tetrahydro - 7 - phenylpyrrolo[3,2,1-jk][1,4] benzodiazepine hydrochloride, melting point 276° C. (dec.).

Analysis.—Calcd. for $C_{17}H_{16}N_2 \cdot HCl$ (percent): C, 71.69; H, 6.02; Cl, 12.45; N, 9.84. Found (percent): C, 71.38; H, 5.96; Cl, 12.49; N, 9.35.

(b) 4,5 - dihydro - 7 - phenylpyrrolo[3,2,1-jk][1,4] benzodiazepine and hydrobromide thereof.—Elution of the product, 4,5-dihydro-7-phenylpyrrolo[3,2,1-jk][1,4] benzodiazepine, begins with fraction 26 and is continued until the elution is complete.

The base is then treated with methanolic hydrogen bromide and crystallized from methanol-ethyl acetate to give 0.897 g. of the crude hydrobromide. The crude hydrobromide is recrystallized from methanol-ethyl acetate to give 4,5 - dihydro - 7-phenylpyrrolo[3,2,1-jk][1,4]benzodiazepine hydrobromide, melting point 275° C. (dec.).

Analysis.—Calcd. for $C_{17}H_{14}N_2 \cdot HBr$ (percent): C, 62.39; H, 4.62; Br, 24.42; N, 8.56. Found (percent): C, 62.41; H, 4.73; Br, 24.01; N, 8.74.

This salt is also prepared in Example 2.

Using the procedure described in Example 3, but replacing 1,2,4,5,6,7 - hexahydro - 7 - phenylpyrrolo[3,2,1-jk][1,4]benzodiazepine by the appropriately substituted 1,2,4,5,6,7 - hexahydro - 7 - phenylpyrrolo[3,2,1-jk][1,4] benzodiazepine is productive of the corresponding 4,5-dihydro - 7-phenylpyrrolo[3,2,1-jk][1,4]benzodiazepines. Representative of the benzodiazepines so obtained are the benzodiazepines disclosed in Example 2, except those containing halogen.

EXAMPLE 4

1-chloro-4,5-dihydro-7-phenylpyrrolo[3,2,1-jk][1,4] benzodiazepine and hydrobromide thereof A stirred mixture of 4.65 g. (0.025 mole) of 4,5-dihydropyrrolo[3,2,1 - jk][1,4]benzodiazepine - 7(6H)-one (Preparation H), 11.45 g. (0.055 mole) of phosphorus pentachloride, and 150 ml. of dry benzene, under nitrogen, is kept at ambient temperature for 1.5 hours and then is refluxed for 3 hours. The mixture is cooled and concentrated in vacuo. The residue is twice suspended in benzene with concentration after each addition. A stirred suspension of the resulting yellow-green solid in 150 ml. of diethyl ether is cooled in an ice bath, under nitrogen, and treated during about 30 minutes with 25 ml. of 1.99 M phenyl lithium in 70:30 benzene-diethyl ether. This mixture is allowed to remain in the ice bath for an additional 35 minutes and is poured into water. The resulting mixture is filtered through diatomaceous earth; the filter cake is washed well with diethyl ether. The filtrate is extracted with diethyl ether, and the combined ether extract and washing is back extracted with cold, dilute hydrochloric acid. The acid solution is cooled in an ice bath, made alkaline with sodium hydroxide and extracted with diethyl ether. The ether extract is washed with a saturated solution of sodium chloride, dried over anhydrous potassium carbonate and concentrated in vacuo to give crude 1 - chloro - 4,5 - dihydro-7-phenylpyrrolo[3,2,1-jk][1,4] benzodiazepine as a residue.

An ethyl acetate solution of the residue is acidified with methanolic hydrogen bromide, and the salt is crystallized from methanol-ethyl acetate to give 0.742 g. of 1-chloro - 4,5 - dihydro - 7 - phenylpyrrolo[3,2,1-jk][1,4] benzodiazepine hydrobromide, melting point 301.5–304° C. (dec.).

Analysis.—Calcd. for $C_{17}H_{13}ClN_2 \cdot HBr$ (percent): C, 56.45; H, 3.90; Br, 22.10; Cl, 9.80; N, 7.75. Found (percent): C, 56.71; H, 4.05; Br, 21.85; Cl, 9.90; N, 7.68.

Using the procedure described in Example 4, but replacing 4,5 - dihydropyrrolo[3,2,1-jk][1,4]benzodiazepin-7(6H)-one by the appropriately substituted 4,5-dihydropyrrolo[3,2,1-jk][1,4]benzodiazepin - 7(6H) - one is productive of the corresponding 1-chloro-4,5-dihydropyrrolo-[3,2,1-jk][1,4]benzodiazepine and hydrobromide thereof. Representative of the compounds so obtained are:

1-chloro-4,5-dihydro-9-methyl-7-phenylpyrrolo-
1-chloro-4,5-dihydro-9-methoxy-7-phenylpyrrolo-
1,9-dichloro-4,5-dihydro-7-phenylpyrrolo-
1-chloro-4,5-dihydro-8-ethyl-7-phenylpyrrolo-
1-chloro-4,5-dihydro-9-ethyl-7-phenylpyrrolo-
1-chloro-4,5-dihydro-10-ethyl-7-phenylpyrrolo-
9-bromo-1-chloro-4,5-dihydro-7-phenylpyrrolo- and
1-chloro-8-fluoro-4,5-dihydro-7-phenylpyrrolo-
[3,2,1-jk][1,4]benzodiazepines and hydrobromides thereof.

EXAMPLE 5

4,5-dihydropyrrolo[3,2,1-jk][1,4]benzodiazepine and hemiperchlorate thereof

A stirred mixture of 26.6 g. of activated manganese dioxide and 750 ml. of benzene is refluxed, under nitrogen, for 4 hours with azeotropic distillation of water. It is then cooled and treated with 13.2 g. (0.0765 mole) of 4,5,6,7 - tetrahydropyrrolo[3,2,1-jk][1,4]benzodiazepine (Preparation K). This mixture is refluxed for 18 hours, cooled and filtered. The filter cake is washed with methylene chloride and the combined filtrate and washing is concentrated in vacuo to yield 4,5-dihydropyrrolo[3,2,1-jk][1,4]benzodiazepine as a yellow oil.

A solution of the residual oil in diethyl ether is acidified with 70% aqueous perchloric acid to give a yellow solid. The solid is collected by filtration, washed with diethyl ether and recrystallized from methanol to give 12.42 g. (73.7%) of crude product. The product is crystallized from methanol to give 4,5-dihydropyrrolo[3,2,1-jk][1,4]benzodiazepine hemiperchlorate, melting point 171–174° C.

Analysis.—Calcd. for $C_{11}H_{10}N_2 \cdot \frac{1}{2}HClO_4$ (percent): C, 59.94; H, 4.80; N, 12.71; Cl, 8.04. Found (percent): C, 59.76; H, 4.89; N, 12.50; Cl, 8.30.

Using the procedure described in Example 5, but replacing 4,5,6,7 - tetrahydropyrrolo[3,2,1-jk][1,4]benzodiazepine by the appropriately substituted 4,5,6,7-tetrahydropyrrolo[3,2,1-jk][1,4]benzodiazepine is productive of the corresponding 4,5-dihydropyrrolo[3,2,1-jk][1,4] benzodiazepine and its hemiperchlorate. Representative of the compounds so obtained are:

4,5-dihydro-9-methylpyrrolo-
4,5-dihydro-9-methoxypyrrolo-
9-chloro-4,5-dihydropyrrolo-
4,5-dihydro-8-ethylpyrrolo-
4,5-dihydro-9-ethylpyrrolo-
4,5-dihydro-10-ethylpyrrolo-
9-bromo-4,5-dihydropyrrolo-
4,5-dihydro-8-fluoropyrrolo[3,2,1-jk][1,4]-benzodiazepines and hemiperchlorates thereof.

I claim:
1. A compound selected from the group consisting of (a) a compound having the formula

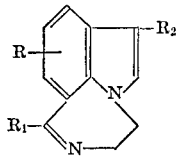

wherein R is selected from the group consisting of hydrogen, alkyl of from 1 to 3 carbon atoms, inclusive, alkoxy of from 1 to 3 carbon atoms, inclusive, bromo, chloro, and fluoro; $R_1$ is selected from the group consisting of hydrogen, methoxy, ethoxy and phenyl; and $R_2$ is selected from the group consisting of hydrogen and chloro; and (b) the addition salts with pharmacologically acceptable acids of the compound of the above formula.

2. A compound of claim 1 wherein R and $R_2$ are hydrogen and $R_1$ is phenyl.
3. The hydrobromide of the compound of claim 2.
4. A compound of claim 1 wherein R is hydrogen, $R_1$ is phenyl and $R_2$ is chloro.
5. The hydrobromide of the compound of claim 4.
6. A compound of claim 1 wherein R, $R_1$ and $R_2$ are hydrogen.
7. The hemiperchlorate of the compound of claim 6.
8. A compound of claim 1 wherein R and $R_2$ are hydrogen and $R_1$ is ethoxy.
9. The fluoroborate of the compound of claim 8.

10. A process for preparing a compound having the formula

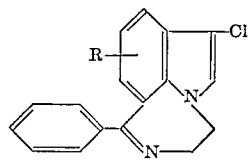

wherein R is selected from the group consisting of hydrogen, alkyl of from 1 to 3 carbon atoms, inclusive, alkoxy of from 1 to 3 carbon atoms, inclusive, bromo, chloro and fluoro, which comprises (a) heating a compound having the formula

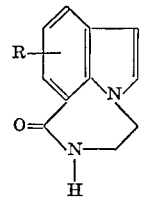

wherein R is the same as above, with two equivalents of phosphorous pentachloride in an inert solvent, (b) removing the solvent, and (c) reacting the resulting product with phenyl lithium in ether at about 0° C.

References Cited

Maitlis: Chem. Abs., vol. 52, 10112–13 (1958), Abs. of Proc. Chem. Soc. (1957), pp. 354–5.

ALTON D. ROLLINS, Primary Examiner

J. A. NARCAVAGE, Assistant Examiner

U.S. Cl. X.R.

260—239.3 T, 289, 303.1, 326.11, 326.16, 326.3, 326.9; 424—274

UNITED STATES PATENT OFFICE
CERTIFICATE OF CORRECTION

Patent No. 3,642,820      Dated February 15, 1972

Inventor(s) Jackson B. Hester, Jr.

It is certified that error appears in the above-identified patent and that said Letters Patent are hereby corrected as shown below:

Column 2, line 68, for "[3,21-jk]" read -- [3,2,1-jk] --. Column 3, line 10, for "(1a)" read -- (Ia) --; line 17, for "The 5,5-" read -- The 4,5- --. Column 4, line 18, for "heating" read -- heating the --; line 65, for "[3.2,1-kg]" read -- [3,2,1-jk] --. Column 5, Formula IX, for "N-H$_2$" read -- NH$_2$ --; line 10, for "NaIOa" read -- NaIO$_4$ --. Column 8, Formula 3, should appear as shown below instead of as in the patent:

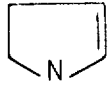

Column 8, lines 29-30, for "<u>Monilina fracticola, Rhizoctonia sloani</u>, Stemphylium spp. and Verticillium" read -- <u>Monilinia fructicola, Rhizoctonia solani</u>, Stemphylium spp. and <u>Verticillium</u> --. Column 11, line 5, for "C$_{17}$T$_{14}$N$_2$O" read -- C$_{17}$H$_{14}$N$_2$O --; line 67, for "10-propoxy" read -- 10-isopropoxy --. Column 12, line 16, for "[1,2,4-ef]" read -- [1,2,3-ef] --; line 29, for "Fraction" read -- Fractions --; line 61, for "hexenes" read --hexanes --. Column 13, line 11, for "(1)" read -- (I) --.

Signed and sealed this 5th day of September 1972.

(SEAL)
Attest:

EDWARD M. FLETCHER, JR.          ROBERT GOTTSCHALK
Attesting Officer                 Commissioner of Patents